US011173614B2

(12) United States Patent
Adachi et al.

(10) Patent No.: US 11,173,614 B2
(45) Date of Patent: Nov. 16, 2021

(54) CONTROL APPARATUS AND ROBOT SYSTEM

(71) Applicant: Seiko Epson Corporation, Tokyo (JP)

(72) Inventors: Hiroki Adachi, Matsumoto (JP); Masaki Motoyoshi, Azumino (JP)

(73) Assignee: Seiko Epson Corporation

( * ) Notice: Subject to any disclaimer, the term of this patent is extended or adjusted under 35 U.S.C. 154(b) by 197 days.

(21) Appl. No.: 16/666,556

(22) Filed: Oct. 29, 2019

(65) Prior Publication Data

US 2020/0130200 A1 Apr. 30, 2020

(30) Foreign Application Priority Data

Oct. 30, 2018 (JP) .............................. JP2018-203703

(51) Int. Cl.
*B25J 13/08* (2006.01)
*B25J 9/16* (2006.01)

(52) U.S. Cl.
CPC ............. *B25J 13/085* (2013.01); *B25J 9/163* (2013.01)

(58) Field of Classification Search
CPC ........ B25J 13/085; B25J 9/163; B25J 9/1666; B25J 9/0081; G05B 2219/39082; G05B 2219/36429; G05B 2219/36473; G05B 2219/40582; G05B 19/423
USPC ....................................................... 700/258
See application file for complete search history.

(56) References Cited

U.S. PATENT DOCUMENTS

| | | | |
|---|---|---|---|
| 5,363,474 A | 11/1994 | Sarugaku et al. | |
| 10,315,313 B2* | 6/2019 | Toyoda | B25J 13/085 |
| 10,946,517 B2* | 3/2021 | Hiraide | B25J 13/088 |
| 2004/0128030 A1* | 7/2004 | Nagata | B25J 9/1633 |
| | | | 700/245 |
| 2005/0166413 A1* | 8/2005 | Crampton | B25J 13/088 |
| | | | 33/503 |
| 2011/0093120 A1* | 4/2011 | Ando | B25J 9/1638 |
| | | | 700/260 |
| 2011/0270443 A1* | 11/2011 | Kamiya | G05B 19/401 |
| | | | 700/245 |
| 2014/0039681 A1* | 2/2014 | Bowling | A61B 34/32 |
| | | | 700/261 |
| 2014/0188281 A1* | 7/2014 | Nagai | B25J 9/0081 |
| | | | 700/264 |

(Continued)

FOREIGN PATENT DOCUMENTS

| | | |
|---|---|---|
| JP | H04-344505 A | 12/1992 |
| JP | H11-231925 A | 8/1999 |

(Continued)

*Primary Examiner* — Jaime Figueroa
(74) *Attorney, Agent, or Firm* — Harness, Dickey & Pierce, P.L.C.

(57) ABSTRACT

When a first condition that a time in which magnitude of a first detection force detected by a force detection unit is larger than a first force threshold value continued for a time longer than zero and shorter than a first time threshold value is satisfied in teaching, a movable unit is moved in a predetermined amount in a direction according to a direction of the first detection force. When a second condition that magnitude of a second detection force detected by the force detection unit is larger than a second force threshold value that is larger than the first force threshold value is satisfied during movement of an end effector, the movable unit is decelerated or stopped.

10 Claims, 10 Drawing Sheets

(56) References Cited

U.S. PATENT DOCUMENTS

| | | | |
|---|---|---|---|
| 2014/0358282 A1* | 12/2014 | Izumi | B25J 9/1694 |
| | | | 700/258 |
| 2015/0290809 A1 | 10/2015 | Nakagawa et al. | |
| 2016/0100898 A1* | 4/2016 | Jinno | A61B 34/30 |
| | | | 606/130 |
| 2017/0028553 A1* | 2/2017 | Tsuda | B25J 13/085 |
| 2017/0080562 A1* | 3/2017 | Tsuzaki | B25J 9/1633 |
| 2017/0120450 A1* | 5/2017 | Toyoda | B25J 13/085 |
| 2018/0021949 A1* | 1/2018 | Miura | B25J 9/1633 |
| | | | 700/250 |
| 2018/0036891 A1* | 2/2018 | Monsarrat | B25J 9/1653 |
| 2018/0079090 A1* | 3/2018 | Koenig | B25J 18/04 |
| 2018/0210434 A1 | 7/2018 | Iwatake | |
| 2018/0281186 A1* | 10/2018 | Hiraide | B25J 13/085 |
| 2018/0345502 A1* | 12/2018 | Amano | B25J 13/082 |
| 2019/0358812 A1* | 11/2019 | Motoyoshi | G05B 19/423 |
| 2019/0381669 A1* | 12/2019 | Ogawara | B25J 9/1694 |
| 2020/0061816 A1* | 2/2020 | Karito | B25J 9/1633 |
| 2020/0078096 A1* | 3/2020 | Barbagli | A61B 17/00234 |
| 2020/0122323 A1* | 4/2020 | Inaba | B25J 9/1697 |

FOREIGN PATENT DOCUMENTS

| | | |
|---|---|---|
| JP | 2002-283276 A | 10/2002 |
| JP | 2003-025272 A | 1/2003 |
| JP | 2015-199174 A | 11/2015 |

\* cited by examiner

CONTROL APPARATUS AND ROBOT SYSTEM

The present application is based on, and claims priority from, JP Application Serial Number 2018-203703, filed Oct. 30, 2018, the disclosure of which is hereby incorporated by reference herein in its entirety.

BACKGROUND

1. Technical Field

The present disclosure relates to a robot on which teaching of an action is performed by application of an external force.

2. Related Art

In related art, there is a robot having the so-called direct teaching function to which a working position is taught by a teacher holding a hand of the robot. In the technique of JP-A-11-231925, a six-axis force sensor is attached to the wrist of the robot and an end effector is attached to the distal end thereof via a teaching handle and a spring coil. To the teaching handle, a control changeover switch between compliance control and position control and an input switch for force information are attached.

A control mode of a compliance control unit is changed between normal position control and the compliance control based on a signal from a mode changeover switch. At direct teaching of the robot, the compliance control unit is in a direct teaching state in which the spring coefficient is zero and the robot is freely movable or a state of the position control in which the respective axes are locked. Force information/position information acquisition means acquires information of the force sensor at the time and current positions of the respective axes using the force information input switch and stores as teaching data in teaching data storage means.

As one aspect of direct teaching of teaching an action to the robot by applying an external force to the robot, there is a technique, at each time when an external force is applied to the hand of the robot for a short time, of moving the hand of the robot in a fixed amount in a direction according to the direction in which the external force is applied. When the external force is continuously applied to the hand of the robot, the hand of the robot is placed substantially in a target position, then, the processing is repeatedly performed, and thereby, the hand of the robot may be accurately placed in the target position.

In the above described techniques, when a configuration closer to the side of the base of the robot than the wrist of the robot collides with another configuration than the robot while the hand moves in the fixed amount due to application of the external force to the robot in the short time, accurate sensing of the collision may be hard. As a result, the robot may be broken.

SUMMARY

According to an aspect of the present disclosure, a robot system is provided. The robot system includes a robot having a base, a movable unit supported by the base and moving an end effector, and one or more force detection units that detect a force applied to the movable unit, and a control unit that controls the movable unit according to the force detected by the one or more force detection units in teaching of the robot to execute movement of the end effector. When a first condition that a time in which magnitude of a first detection force detected by the one or more force detection units is larger than a first force threshold value continued for a time longer than zero and shorter than a first time threshold value is satisfied in the teaching, the control unit executes the movement of the end effector in a predetermined amount in a direction according to a direction of the first detection force, and, when a second condition that magnitude of a second detection force detected by the one or more force detection units is larger than a second force threshold value that is larger than the first force threshold value is satisfied during the movement, decelerates or stops the end effector.

DESCRIPTION OF EXEMPLARY EMBODIMENTS

A. First Embodiment

A1. Configuration of Robot System

Figure 1:
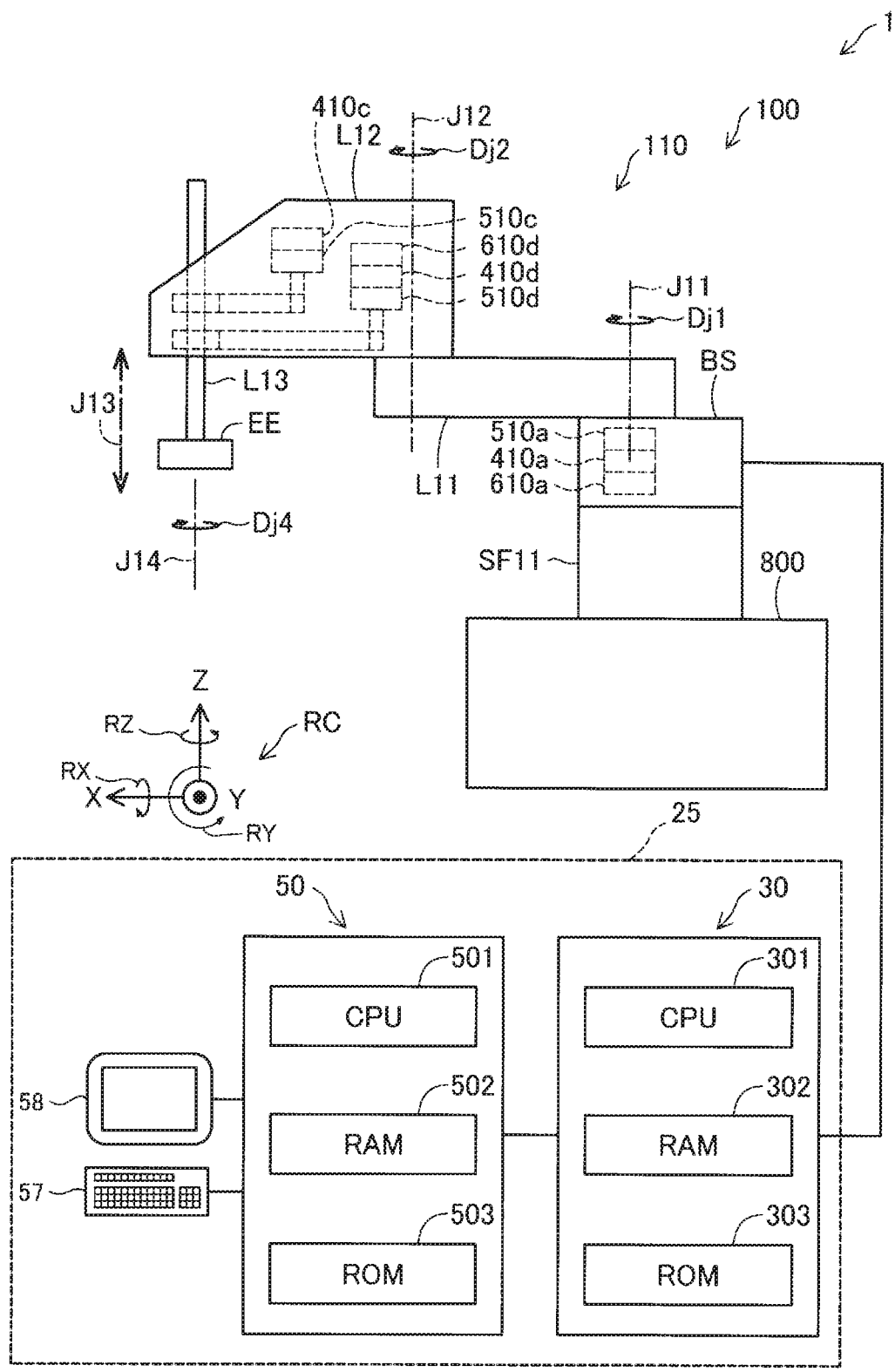
FIG. 1 is an explanatory diagram schematically showing a robot system of a first embodiment.

FIG. 1 is the explanatory diagram schematically showing the robot system 1 of the first embodiment. The robot system 1 of the embodiment includes the robot 100, an end effector EE, and a robot control apparatus 25. In FIG. 1, for facilitating understanding of the technique, a robot coordinate system RC is shown.

The robot coordinate system RC is a three-dimensional orthogonal coordinate system defined by an X-axis and a Y-axis orthogonal to each other on a horizontal plane and a Z-axis along a vertically upward direction as a positive direction. An arbitrary posture in the robot coordinate system RC is expressed by an angular position RX about the X-axis, an angular position RY about the Y-axis, and an angular position RZ about the Z-axis.

The robot 100 is a scalar robot. In this specification, "scalar robot" is the so-called horizontal articulated robot, and includes a plurality of arm elements forming an arm and rotating about rotation axes along directions parallel to one another, but does not include arm elements rotating about rotation axes along directions perpendicular to the rotation axes of the plurality of arm elements.

The robot 100 is a four-axis robot having an arm 110 including four joints J11 to J14. The arm 110 is supported by a base BS via the joint J11. The arm 110 may move the end effector EE. Note that, in this specification, "movement" includes a position change and a posture change.

In the arm 110, the joints J11, J12, J14 are rotary joints rotating about rotation axes along directions parallel to the Z-axis directions of the robot coordinate system RC. In FIG. 1, the rotation directions in the joints J11, J12, J14 are shown by Dj1, Dj2, Dj4, respectively. The joint 13 is a prismatic joint that moves in directions parallel to the Z-axis directions. Component elements between the joints adjacent to each other of the plurality of joints forming the arm 110 are referred to as "arm elements" in the specification. In FIG. 1, an arm element L11 between the joint J11 and the joint J12, an arm element L12 between the joint J12 and the joint J13, and an arm element L13 forming the distal end of the arm 110 and moved by the joints J13, J14 are shown with the signs. The arm element L11 is coupled to the base BS via the joint J11.

The robot 100 respectively includes servo motors 410, reducers 510, and torque sensors 610 in the joints J11 to J14. The servo motors 410 are controlled by an action control apparatus 30 and rotate output shafts thereof. The reducers 510 reduce and transmit the rotations of the output shafts of the servo motor 410 to the arm elements. The torque sensors 610 detect torques externally applied to the rotary joints J11, J12, J14.

In FIG. 1, the servo motor 410a, the reducer 510a, and the torque sensor 610a driving the joint J11, the servo motor 410c, the reducer 510c, and the torque sensor 610c driving the joint J13, and the servo motor 410d, the reducer 510d, and the torque sensor 610d driving the joint J14 are shown with the signs. In this specification, the servo motors 410a to 410d are referred to as "servo motors 410" when mentioned without distinction from one another. The reducers 510a to 510d are referred to as "reducers 510" when mentioned without distinction from one another. The torque sensors 610a, 610c, 610d are referred to as "torque sensors 610" when mentioned without distinction from one another.

A male screw is formed in an outer surface of a part of the arm element L13. The part of the arm element L13 functions as a ball screw. The arm element L13 as the ball screw is moved in directions shown by an arrow J13 relative to the arm element L12 by the servo motor 410d.

The robot 100 may place the end effector EE attached to the distal end portion of the arm 110 in a designated position and a designated posture in the three-dimensional space by respectively rotating or linearly moving the joints J11 to J14 by the servo motors 410. Note that a point representing the position of the end effector EE in the three-dimensional space, i.e., a control point is also referred to as "TCP (Tool Center Point".

The base BS is fixed to a floor part 800 and supports the arm 110. In the base BS, a force detection unit SF11 is provided. More specifically, the force detection unit SF11 is located between the base BS and the floor part 800. The force detection unit SF11 is a force sensor including a quartz crystal piezoelectric element. The force detection unit SF11 may detect forces applied to the arm 110 and an arbitrary configuration attached to the arm 110. Note that, in this specification, "force" includes a force that linearly acts and a torque. In this specification, "directions" of the force includes rectilinear directions and rotational directions.

The force detection unit SF11 may detect forces in the three axis directions of the X-axis, the Y-axis, and the Z-axis and torques about a U-axis, a V-axis, and a W-axis as rotation axes applied externally, i.e., applied from another configuration than the force detection unit SF11. As a result, the force detection unit SF11 may measure the forces in the three axis directions of the X-axis, the Y-axis, and the Z-axis and the torques about the U-axis, the V-axis, and the W-axis acting on the arm 110 as another configuration than the force detection unit SF11. The output of the force detection unit SF11 is transmitted to the action control apparatus 30 and used for control of the robot 100.

The floor part 800 supports the base BS via the force detection unit SF11. The floor part 800 is a floor of a factory in which the robot 100 is installed. In FIG. 1, for facilitating understanding of the technique, the floor part 800 is shown in a rectangular shape.

The end effector EE is attached to the distal end of the arm 110. The end effector EE may be controlled by the action control apparatus 30 to grip a workpiece WK as an object of work and release the gripped workpiece WK. As a result, for example, the end effector EE and the robot 100 are controlled by the action control apparatus 30 to grip and move the workpiece WK. Note that, in FIG. 1, for facilitating understanding of the technique, the illustration of the workpiece WK is omitted and the end effector EE is shown in a simple rectangular shape.

The robot control apparatus 25 controls the robot 100. The robot control apparatus 25 includes the action control apparatus 30 and a teaching apparatus 50.

The action control apparatus 30 is a control apparatus that controls the action of the robot 100. The action control apparatus 30 is coupled to the robot 100. The action control apparatus 30 includes a CPU (Central Processing Unit) 301 as a processor, a RAM (Random Access Memory) 302, and a ROM (Read-Only Memory) 303. In the action control apparatus 30, control programs for control of the robot 100 are installed. In the action control apparatus 30, the CPU 301, the RAM 302, and the ROM 303 as hardware resources and the control programs cooperatively operate. Specifically, the CPU 301 loads the computer programs stored in the ROM 303 in the RAM 302 and executes the programs, and thereby, realizes various functions.

The teaching apparatus 50 is an apparatus for teaching a target position and a target force to the action control apparatus 30. The teaching apparatus 50 includes a CPU 501 as a processor, a RAM 502, and a ROM 503. In the teaching apparatus 50, control programs for teaching the target position and the target force to the action control apparatus 30 are installed. In the teaching apparatus 50, the CPU 501, the RAM 502, and the ROM 503 as hardware resources and the control programs cooperatively operate. Specifically, the CPU 501 loads the computer programs stored in the ROM 503 in the RAM 502 and executes the programs, and thereby, realizes various functions. For example, in the teaching of the robot 100, the CPU 501 controls the arm 110 according to the force detected by the force detection unit SF11 and executes movement of the end effector EE.

The teaching apparatus 50 further includes an input device 57 and an output device 58. The input device 57 receives an instruction from a user. The input device 57 includes e.g. a mouse, keyboard, touch panel, etc. The output device 58 outputs various kinds of information to the user. The output device 58 includes e.g. a display, speaker, etc.

Figure 2:
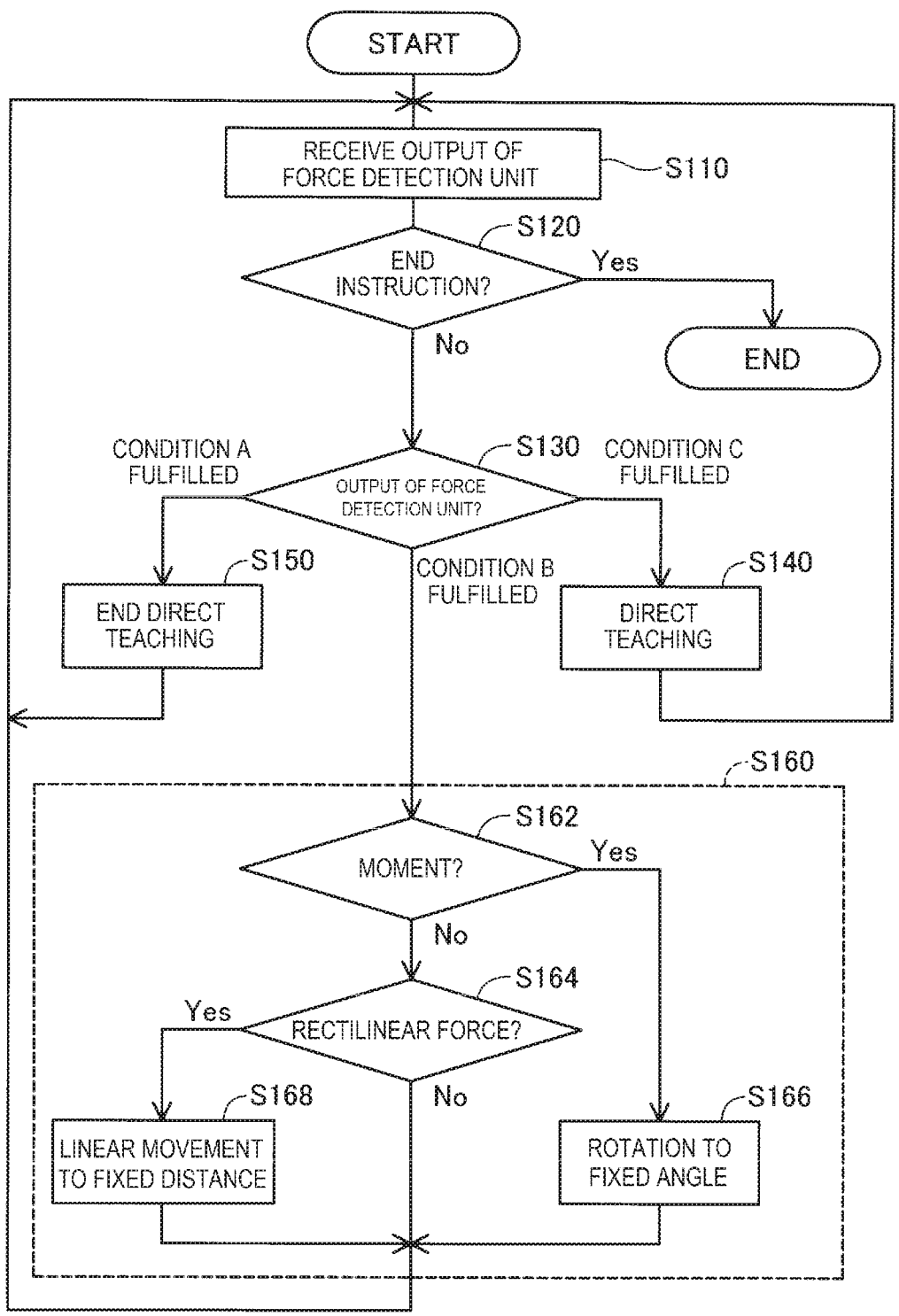
FIG. 2 is a flowchart showing an action of a robot when teaching by direct teaching is performed on the robot.

FIG. 2 is the flowchart showing the action of the robot 100 when teaching by direct teaching is performed on the robot. The teaching to the robot 100 is performed by a teacher applying an external force to the end effector EE. Here, the teacher teaches the target position of the control point to the robot system 1 by applying an external force to the end effector EE. The processing in FIG. 2 is executed by the CPU 501 of the teaching apparatus 50.

At step S110, the CPU 501 receives output of the force detection unit SF11 (see FIG. 1). At step S110, the force detected by the force detection unit SF11 is referred to as "first detection force Fd1".

At step S120, the CPU 501 determines whether or not an instruction to end the teaching by direct teaching is input via the input device 57 (see FIG. 1). When the end instruction is input, the processing in FIG. 2 ends. When the instruction to end the teaching is not input for a predetermined time, specifically, after the processing at step S120 is previously performed, through processing at steps S130 to S160, and before the processing at step S120 is performed again, the processing moves to step S130. The processing at steps S130 to S160 and S110 is repeated in a predetermined first period until the instruction to end the teaching by direct teaching is input.

At step S130, the CPU 501 determines whether or not any of the following conditions A, B, C is satisfied with respect to the output of the force detection unit SF11. Note that, when none of the following conditions A, B, C is satisfied, the processing returns to step S110. For facilitating understanding of the technique, illustration of the processing flow when none of the following conditions A, B, C is satisfied is omitted in FIG. 2. The magnitude of the first detection force Fd1 is obtained by synthesis of force components in the respective directions detected by the force detection unit SF11. Note that, first, the explanation will be made on the assumption that the first detection force Fd1 is a rectilinear force.

Condition A: A time in which the magnitude of the first detection force Fd1 is smaller than a third force threshold value Fth3 continued for a time longer than an end time threshold value Tthe.

Condition B: Condition B1 or Condition B2 is satisfied.

Condition B1: A time in which the magnitude of the first detection force Fd1 is larger than a first force threshold value Fth1 continued for a time longer than zero and shorter than a first time threshold value Tth1.

Condition B2: A time in which the magnitude of the first detection force Fd1 is larger than the third force threshold value Fth3 and smaller than the first force threshold value Fth1 continued for a duration longer than a second time threshold value Tth2.

Condition C: A time in which the magnitude of the first detection force Fd1 is larger than the first force threshold value Fth1 and smaller than a second force threshold value Fth2 continued for a duration longer than a third time threshold value Tth3.

Note that the relationships among the respective threshold values are as follows.

[third force threshold value Fth3]<[first force threshold value Fth1]<[second force threshold value Fth2]

[first time threshold value Tth1]≤[second time threshold value Tth2],[third time threshold value Tth3]

In the embodiment, the third force threshold value Fth3 is set to 2 N. The first force threshold value Fth1 is set to 6 N. The second force threshold value Fth2 is set to 30 N.

The magnitude relationship between the second time threshold value Tth2 and the third time threshold value Tth3 is determined by specific set values of the second time threshold value Tth2 and the third time threshold value Tth3. In the embodiment, all of the end time threshold value Tthe, the first time threshold value Tth1, the second time threshold value Tth2, and the third time threshold value Tth3 are set to 200 ms.

Condition A is a judgment condition substantially for judgment as to "no external force by the teacher is applied to the end effector EE". At step S130 in FIG. 2, when Condition A is satisfied, the processing moves to step S150.

At step S150, the teaching by direct teaching is ended. Then, the processing returns to step S110.

In the embodiment, the third force threshold value Fth3 is 2 N larger than 1 N. Accordingly, noise assumed in the force detection unit SF11 including the piezoelectric element is removed, "no external force by the teacher is applied to the end effector EE" may be judged.

Condition C at step S130 is a judgment condition substantially for judgment as to "an external force by the teacher is applied to the end effector EE for substantially moving the end effector EE toward the target position". At step S130 in FIG. 2, when Condition C is satisfied, the processing moves to step S140.

Figure 3:
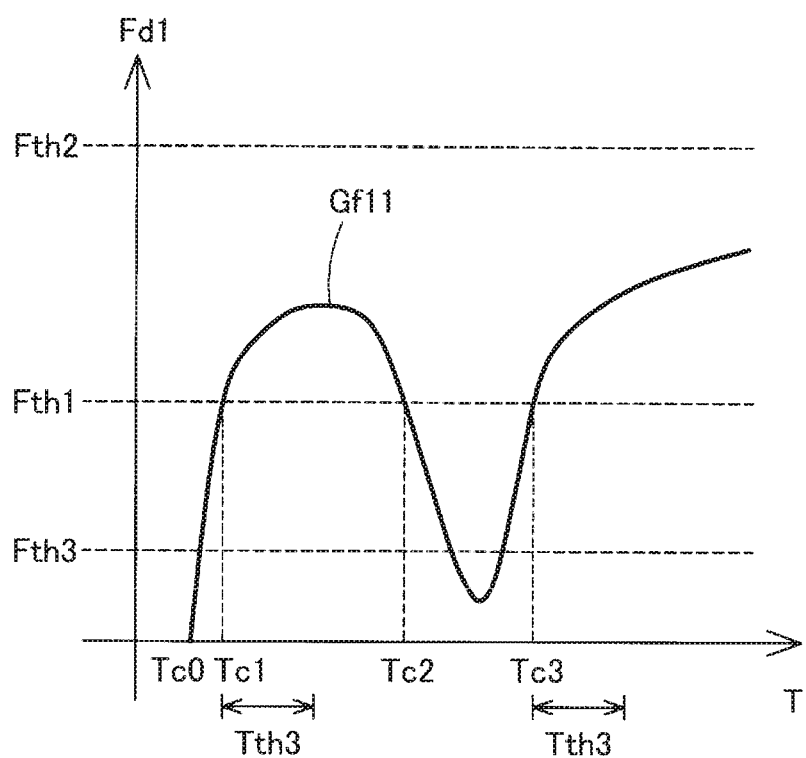
FIG. 3 is a graph for explanation of details of Condition at S130 in FIG. 2.

FIG. 3 is the graph for explanation of details of Condition C at S130 in FIG. 2. The horizontal axis of the graph in FIG. 3 indicates time T. The vertical axis of the graph in FIG. 3 indicates the magnitude of the first detection force Fd1 detected by the force detection unit SF11. The graph Gf11 in FIG. 3 shows an example of temporal changes of the first detection force Fd1.

In the example of FIG. 3, the magnitude of the first detection force Fd1 applied at time Tc0 and subsequent time is between the first force threshold value Fth1 and the second force threshold value Fth2 continuously from time Tc1 to time Tc2, and the duration is longer than the third time threshold value Tth3. In this case, after the third time threshold value Tth3 elapses from time Tc1, the processing moves to step S140 in FIG. 2.

Further, in the example of FIG. 3, the magnitude of the first detection force Fd1 is between the first force threshold value Fth1 and the second force threshold value Fth2 continuously from time Tc3 and the duration is longer than the third time threshold value Tth3. Also, in this case, after the third time threshold value Tth3 elapses from time Tc3, the processing moves to step S140 in FIG. 2.

At step S140, the teaching by direct teaching is performed. That is, the end effector EE is moved according to the force applied by the teacher. As a result, the end effector EE is moved by the teacher to a desired position by the teacher. Then, the processing returns to step S110.

Condition B1 at step S130 is a judgment condition substantially for judgment as to "the end effector EE is slightly tapped by the teacher". At step S130 in FIG. 2, when Condition B1 is satisfied, the processing moves to step S160.

Figure 4:
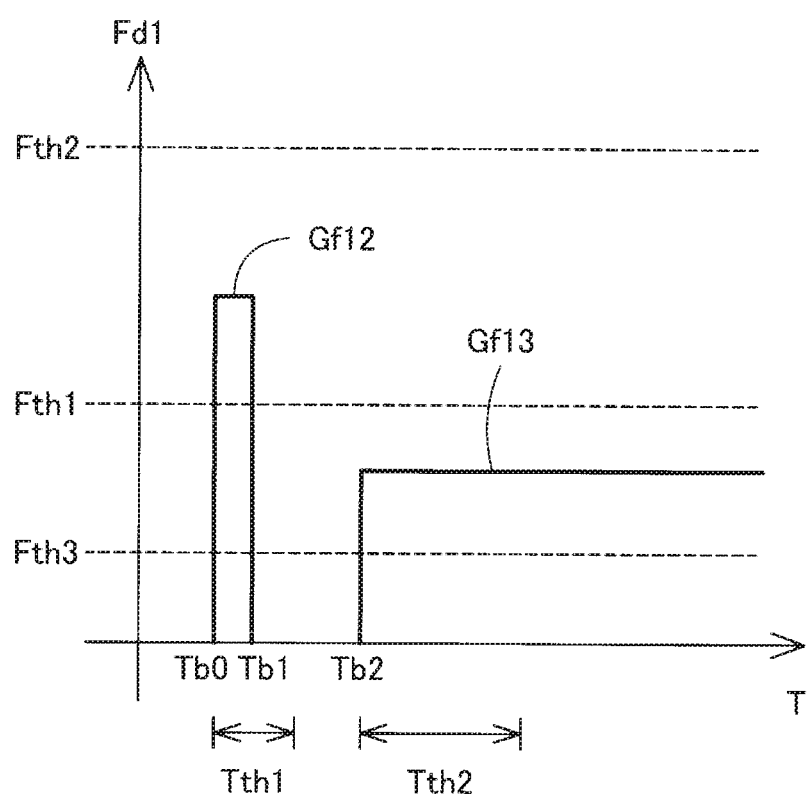
FIG. 4 is a graph for explanation of details of Conditions at S130 in FIG. 2.

FIG. 4 is the graph for explanation of details of Conditions B1, B2 at S130 in FIG. 2. The horizontal axis and the vertical axis of the graph in FIG. 4 are the same as the horizontal axis and the vertical axis of the graph in FIG. 3. The graphs Gf12, Gf13 in FIG. 3 schematically show temporal changes of the first detection force Fd1.

In the example of FIG. 4, the magnitude of the first detection force Fd1 applied at time Tb0 and subsequent time is continuously larger than the first force threshold value Fth1 from time Tb0 to time Tb1, and the duration is shorter than the first time threshold value Tth1. In this case, when the magnitude of the first detection force Fd1 is below the third force threshold value Fth3, the processing moves to step S160 in FIG. 2.

Condition B2 at step S130 is a judgment condition substantially for judgment as to "the end effector EE is continuously pressed with a smaller force by the teacher". At step S130 in FIG. 2, when Condition B2 is satisfied, the processing moves to step S160.

In the example of FIG. 4, the magnitude of the first detection force Fd1 applied at time Tb2 and subsequent time is between the third force threshold value Fth3 and the first force threshold value Fth1 continuously from time Tb2, and the duration is longer than the second time threshold value Tth2. In this case, after the second time threshold value Tth2 elapses from time Tb2, the processing moves to step S160 in FIG. 2.

Note that, in the above description of the processing at step S130 in FIG. 2, for facilitating understanding of the technique, Conditions A, B, C are explained by taking the case where the first detection force Fd1 is the force that linearly acts as an example. However, Conditions A, B, C at step S130 are respectively set for the cases where the first detection force Fd1 is the force that linearly acts and a torque. That is, the first force threshold value to third force threshold value and the end time threshold value and first time threshold value to third time threshold value are set for the case where the first detection force Fd1 is the torque, and Conditions A, B, C are similarly judged.

At step S162 within step S160 in FIG. 2, when the first detection force Fd1 is not moment, i.e., not torque, the processing moves to step S164. On the other hand, when the first detection force Fd1 is moment, i.e., torque, the processing moves to step S166.

At step S166, rotation of the end effector EE is executed in a direction according to the direction of the first detection force Fd1 as the torque in a predetermined amount of angle. In the embodiment, the direction according to the direction of the first detection force Fd1 at step S166 is a direction that forms the smallest angle between the direction of the rotation of the first detection force Fd1 and one of six directions of a U-axis positive direction, a U-axis negative direction, a V-axis positive direction, a V-axis negative direction, a W-axis positive direction, and a W-axis negative direction. Here, "direction of rotation" with respect to a certain rotation is a direction in which a right-handed screw is pushed in by the rotation. In the embodiment, the predetermined angle at step S166 is 0.5°.

At step S164, when the first detection force Fd1 is not the force that linearly acts, the processing returns to step S110. On the other hand, when the first detection force Fd1 is the force that linearly acts, the processing moves to step S168.

At step S168, linear movement of the end effector EE is executed in a predetermined linear distance in a direction according to the direction of the first detection force Fd1. In the embodiment, the direction of the first detection force Fd1 at step S168 is a direction that forms the smallest angle between the direction of the first detection force Fd1 and one of six directions of an X-axis positive direction, an X-axis negative direction, a Y-axis positive direction, a Y-axis negative direction, a Z-axis positive direction, and a Z-axis negative direction. In the embodiment, the predetermined linear distance at step S168 is 0.5 mm.

In FIG. 4, for facilitating understanding of the technique, the graph Gf13 shows that the magnitude of the first detection force Fd1 keeps a constant value at time Tb2 and subsequent time. However, actually, in the graph Gf13, the magnitude of the first detection force Fd1 does not keep the constant value at time Tb2 and subsequent time. When Condition B2 is satisfied, at step S166 or step S168 in FIG. 2, the end effector EE is moved in a fixed amount in a direction according to the direction of the force allowed to act by the teacher. Accordingly, actually, the magnitude of the first detection force Fd1 decreases at least immediately after the start of the movement.

At step S130 in FIG. 2, when Condition B2 is satisfied, and the processing moves to step S160, after the single movement at step S166 or step S168, when Condition B2 remains satisfied, the CPU 501 performs the single movement at step S166 or step S168 again. When Condition B2 is satisfied and the processing moves to step S160, the CPU 501 repeats the judgment and the movement at step S166 or step S168 during the duration of the first detection force Fd1. As a result, the end effector EE is intermittently moved by forces applied by the user. As described above, the magnitude of the first detection force Fd1 decreases immediately after the start of the movement, and thus, actually, the graph Gf13 periodically repeats increase and decrease due to the intermittent movements of the end effector EE after a lapse of the second time threshold value Tth2. The teacher may feel changes of reaction forces of the end effector EE.

By the above described processing, accurate movement in N times (N is a positive integer) the predetermined amount may be realized with respect to the end effector EE with single press by the teacher. Accordingly, load on teaching by the teacher when placing the end effector EE in an accurate position may be reduced.

In the embodiment, the third force threshold value Fth3 is 2 N larger than 1 N. Accordingly, noise assumed in the force detection unit SF11 including the piezoelectric element may be removed, and the movement of the end effector EE in the predetermined amount may be repeatedly executed. Further, the third force threshold value Fth3 is 2 N smaller than 10 N. Accordingly, there is a lower possibility that the teacher is tired by teaching performed with a larger force than the third force threshold value Fth3. Application of an external force to the robot 100 by the teacher with a force larger than the third force threshold value Fth3 is performed in a range in which residual vibration of the arm 110 is sufficiently small.

Figure 5:
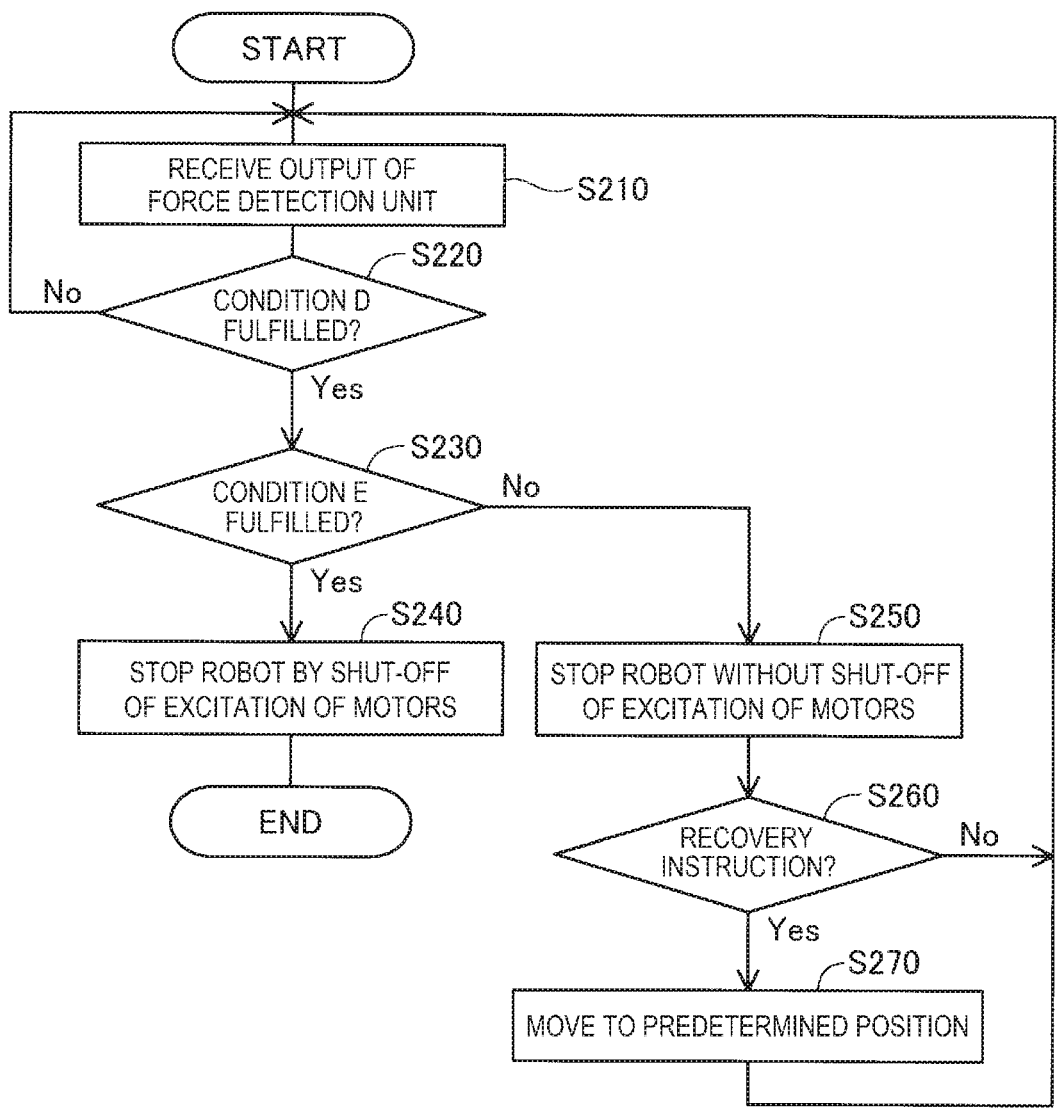
FIG. 5 is a flowchart showing an action of the robot when teaching by direct teaching is performed on the robot.

FIG. 5 is the flowchart showing the action of the robot 100 when teaching by direct teaching is performed on the robot. The processing in FIG. 5 is executed by the CPU 501 of the teaching apparatus 50. The processing in FIG. 5 is executed in parallel to the processing in FIG. 2.

The first period in which the processing in FIG. is repeatedly executed is 20 times a second period in which the processing in FIG. 5 is repeatedly executed. That is, while the processing at step S110 to S160 in FIG. 2 is performed once, the processing at steps S210 to S270 in FIG. 5 is performed at about 20 times. Accordingly, for example, while the movements of the end effector EE at steps S140, S166, S168 in FIG. 2 are performed, the processing in FIG. 5 is repeatedly performed.

At step S210, the CPU 501 receives the output of the force detection unit SF11 (see FIG. 1). The above described processing at step S110 in FIG. 2 may be the same processing as the processing at step S210 in FIG. 5. Note that, even when the processing at step S210 in FIG. 5 is performed, the received output of the force detection unit SF11 at the time is not necessarily used for the processing at step S110 in FIG. 2. Accordingly, at step S210 in FIG. 5, the force detected by the force detection unit SF11 is referred to as "second detection force Fd2" for convenience for distinction from the first detection force Fd1 in the processing at step S110 in FIG. 2.

At step S220 in FIG. 5, the CPU 501 determines whether or not the following condition D is satisfied.

Condition D: The magnitude of the second detection force Fd2 is larger than the second force threshold value Fth2.

Condition D is a judgment condition substantially for judgment as to "the arm 110 or the end effector EE may collide with something". At step S220, when Condition D is not satisfied, the processing returns to step S210. At step S220, when Condition D is satisfied, the processing moves to step S230.

Figure 6:
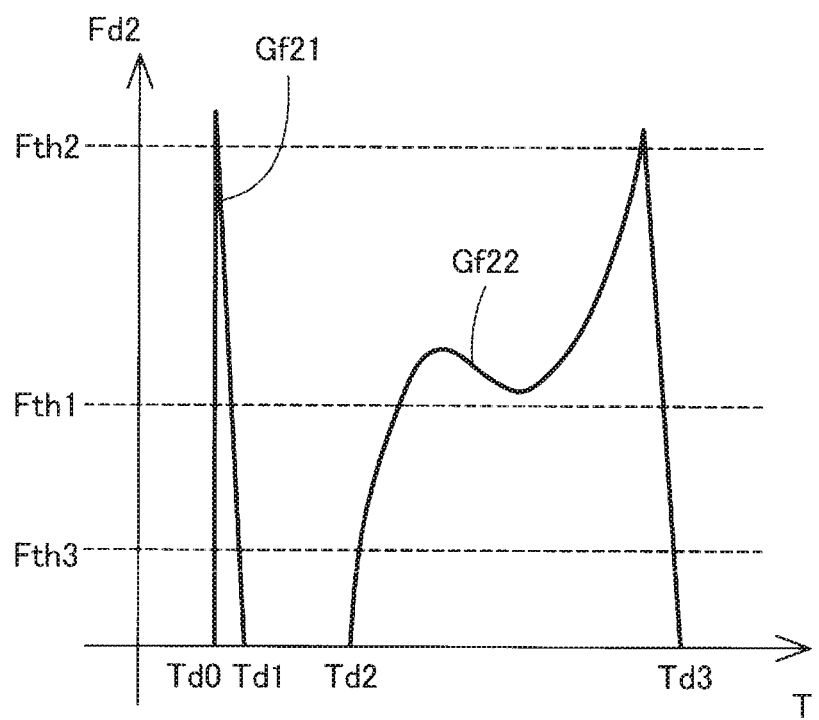
FIG. 6 is a graph for explanation of details of Condition at S220 in FIG. 5.

FIG. 6 is the graph for explanation of details of Condition D at S220 in FIG. 5. The horizontal axis and the vertical axis of the graph in FIG. 6 are the same as the horizontal axis and the vertical axis of the graph in FIG. 3, respectively. The graphs Gf21, Gf22 in FIG. 6 show temporal changes of the second detection force Fd2.

In the example of FIG. 6, the magnitude of the second detection force Fd2 applied from time Td0 to time Td1 is larger than the second force threshold value Fth2 at a certain time. When the magnitude of the second detection force Fd2 is larger than the second force threshold value Fth2, the processing moves to step S230 in FIG. 5.

Further, in the example of FIG. 6, the magnitude of the second detection force Fd2 applied from time Td2 to time Td3 is larger than the second force threshold value Fth2 at a certain time. Also, in this case, when the magnitude of the second detection force Fd2 is larger than the second force threshold value Fth2, the processing moves to step S230 in FIG. 5.

At step S230 in FIG. 5, the CPU 501 determines whether or not the following condition E is satisfied.

Condition E: The magnitude of the second detection force Fd2 is larger than a fourth force threshold value Fth4.

Here, the relationship between the respective threshold values are as follows.

[second force threshold value Fth2]<[fourth force threshold value Fth4]

Condition E is a judgment condition substantially for judgment as to "the arm 110 or the end effector EE is subjected to a force having magnitude that may cause severe damage, or an abnormality occurs in the force detection unit SF11". At step S230, when Condition E is satisfied, the processing moves to step S240. At step S230, when Condition E is not satisfied, the processing moves to step S250.

Figure 7:
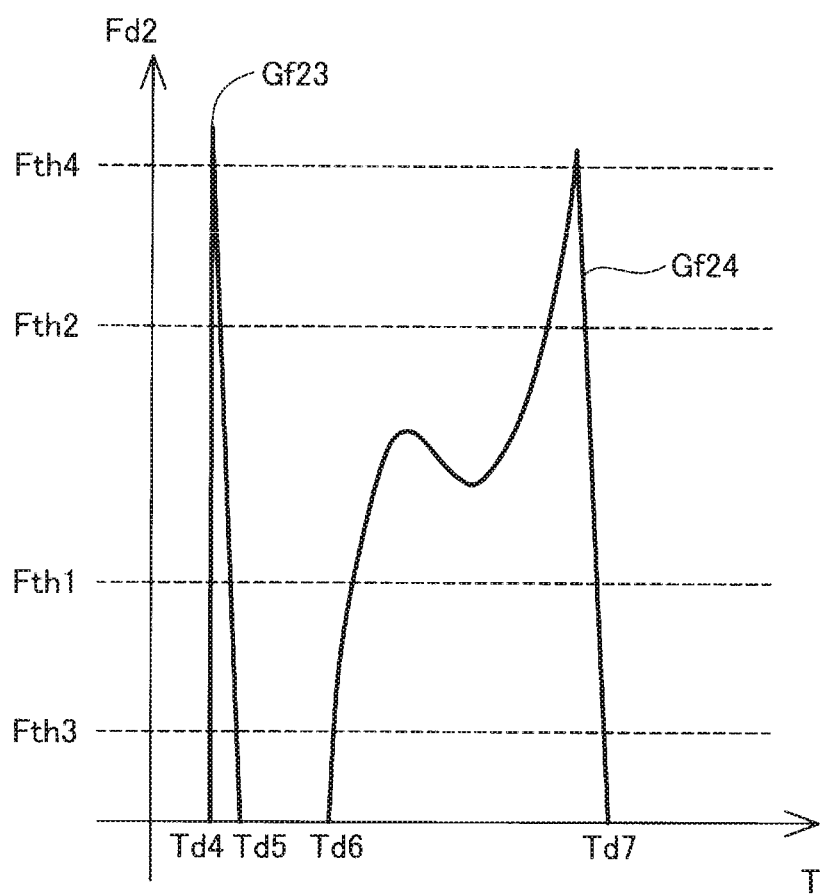
FIG. 7 is a graph for explanation of details of Condition at S230 in FIG. 5.

FIG. 7 is the graph for explanation of details of Condition E at S230 in FIG. 5. The horizontal axis and the vertical axis of the graph in FIG. 7 are the same as the horizontal axis and the vertical axis of the graph in FIG. 3, respectively. The graphs Gf23, Gf24 in FIG. 7 show examples of temporal changes of the second detection force Fd2.

In the example of FIG. 7, the magnitude of the second detection force Fd2 applied from time Td4 to time Td5 exceeds the second force threshold value Fth2 and becomes larger than the fourth force threshold value Fth4. In this case, when the magnitude of the second detection force Fd2 is larger than the fourth force threshold value Fth4, the processing moves to step S240 in FIG. 5.

Further, in the example of FIG. 7, the magnitude of the second detection force Fd2 applied from time Td6 to time Td7 exceeds the second force threshold value Fth2 and becomes larger than the fourth force threshold value Fth4. Also, in this case, when the magnitude of the second detection force Fd2 is larger than the fourth force threshold value Fth4, the processing moves to step S240 in FIG. 5.

At step S240 in FIG. 5, the CPU 501 stops the robot 100 with shut-off of the excitation of the servo motors 410 of the respective joints of the arm 110 (see FIG. 1). That is, stoppage of the end effector EE is executed. Then, the processing in FIG. 5 ends. At step S230, the processing at steps S250 to S270, S210, S220 is repeated in a predetermined second period until Condition E is satisfied.

At step S250, the CPU 501 stops the robot 100 without shut-off of the excitation of the servo motors 410 of the respective joints of the arm 110. That is, the stoppage of the end effector EE is executed.

In the embodiment, the force detection unit SF11 may detect not only the force applied to the end effector EE but also the force applied to the arm 110 (see FIG. 1). Further, by the processing at steps S210 to S250 in FIG. 5, the stoppage of the end effector EE is executed using the force detection unit SF11 that detects the force applied to the arm 110. Accordingly, even when the arm 110 closer to the base BS side than the end effector EE of the robot 100 collides with another configuration than the robot 100, the end effector EE may be stopped.

In the embodiment, for example, during the movement of the end effector EE due to fulfilment of Condition B (see steps S130, S166, S168 in FIG. 2), when a force larger than the second force threshold value Fth2 is applied to the arm 110 by collision, the force may be sensed by the force detection unit SF11 and the end effector EE may be stopped. Accordingly, the possibility of breakage of the robot 100 may be reduced.

At step S260 in FIG. 5, the CPU 501 determines whether or not an instruction to recover the processing of the robot 100 is input via the input device 57 (see FIG. 1). When the instruction to recover the processing is not input for a predetermined time, the processing returns to step S210. When the instruction to recover the processing is input, the processing moves to step S270.

At step S270, the CPU 501 controls the arm 110 to move the end effector EE to a predetermined position. Then, the teacher removes the cause of sensing of the force larger than the second force threshold value Fth2 (see S220 in FIG. 5 and FIG. 6), and when the teacher wants to do, processing of teaching by direct teaching, i.e., the processing in FIGS. 2 and 5 may be restarted.

In the embodiment, the second period in which the processing of collision sensing in FIG. 5 is repeated is shorter than the first period in which the processing of teaching in FIG. 2 is repeated, and thereby, a collision unintendedly occurring during the movement of the end effector EE may be promptly sensed (see S220, S230 in FIG. 5). On the other hand, the first period in which the processing of teaching in FIG. 2 is repeated is made longer than the second period in which the processing of collision sensing in FIG. 5 is repeated, and thereby, an external force applied by the teacher may be sensed with sufficient accuracy and processing load on the CPU 501 may be reduced.

Further, in the embodiment, the first period in which the processing of teaching in FIG. 2 is repeated is set to 20 times the second period in which the processing of collision sensing in FIG. 5 is repeated, and thereby, processing load on the CPU 501 may be appropriately reduced with achieved balance between prompt sensing of a collision unintendedly occurring during the movement of the end effector EE and detection of an external force applied by the teacher with sufficient accuracy.

In the embodiment, in teaching, the CPU 501 executes the movement of the end effector EE (see S140, S166, S168 in FIG. 2) based on the output of the force detection unit SF11 provided in the base BS, and executes the stoppage of the end effector EE (see S240, S250 in FIG. 5) based on the output of the force detection unit SF11 during the movement of the end effector EE. Accordingly, the movement of the end effector EE based on the external force in teaching and the stoppage of the end effector EE during the movement of the end effector EE may be realized by the single force detection unit SF11.

The arm 110 in the embodiment is also referred to as "movable unit". The force detection unit SF11 is also referred to as "first detection unit". The robot control apparatus 25 is also referred to as "control apparatus". The CPU 501 of the teaching apparatus 50 is also referred to as "control unit". Condition B1 is also referred to as "first condition". Condition D is also referred to as "second condition". Condition B2 is also referred to as "third condition".

B. Second Embodiment

Figure 8:
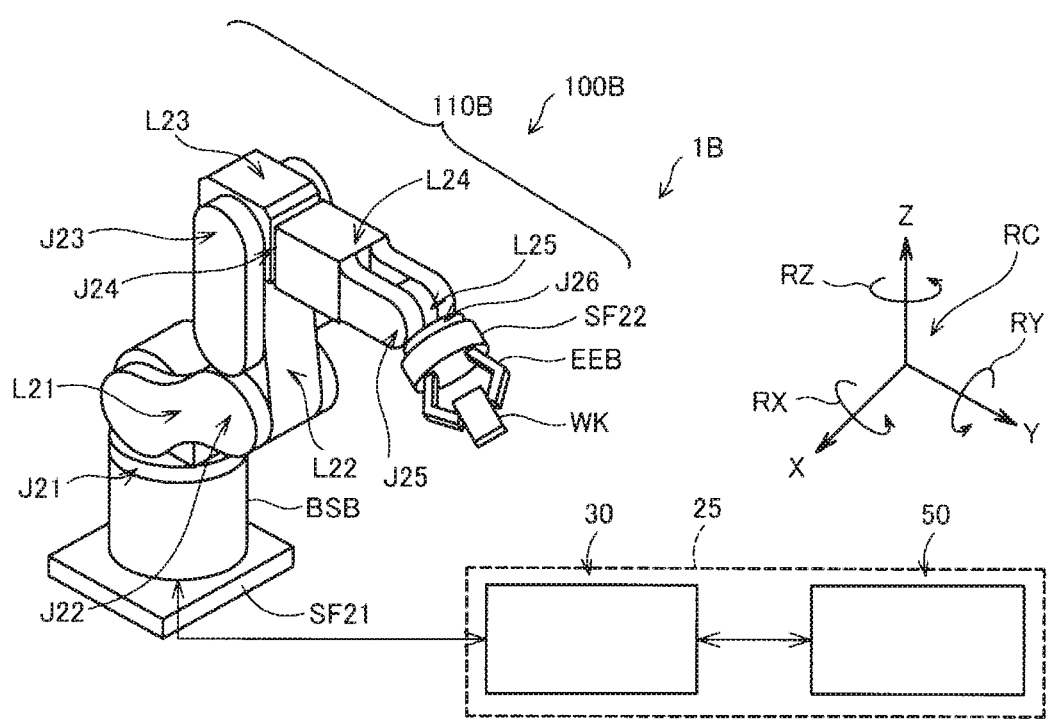
FIG. 8 shows a configuration of a robot system according to a second embodiment.

FIG. 8 shows the configuration of the robot system 1B according to the second embodiment. In FIG. 8, for facilitating understanding of the technique, a robot coordinate system RC is shown. The robot coordinate system RC is the same as the robot coordinate system RC shown in FIG. 1.

The robot system 1B of the second embodiment includes a robot 100B and a robot control apparatus 25. A hardware configuration of the robot control apparatus 25 in the second embodiment is the same as the hardware configuration of the robot control apparatus 25 in the first embodiment (see FIG. 1).

The robot 100B is a vertical articulated robot. The robot 100B is a six-axis robot having an arm 110B including six joints J21 to J26. The arm 110B is supported by a base BSB via the joint J21. The arm 110B may move an end effector EEB. More specifically, the robot 100B may place the end effector EEB attached to the distal end portion of the arm 110B in a designated position and a designated posture in the three-dimensional space by respectively rotating or linearly moving the six joints J21 to J26 of the arm 110B by servo motors.

In the arm 110B, the joint J22, the joint J23, and the joint J25 are bending joints and the joint J21, the joint J24, and the joint J26 are twisting joints. The base BSB and an arm element L21 are coupled via the joint J21. The arm element L21 and an arm element L22 are coupled via the joint J22. The arm element L22 and an arm element L23 are coupled via the joint J23. The arm element L23 and an arm element L24 are coupled via the joint J24. The arm element L24 and an arm element L25 are coupled via the joint J25. The arm element L25 and a force detection unit SF22 and the end effector EEB are coupled via the joint J26.

The end effector EEB is attached to the distal end of the arm 110B via the force detection unit SF22. The function of the end effector EEB is the same as that of the end effector EE (see FIG. 1).

The force detection unit SF22 is provided between the arm 110B and the end effector EEB. The function and the operation principle of the force detection unit SF22 are the same as those of the force detection unit SF11 of the first embodiment (see FIG. 1). According to the configuration, the force applied to the end effector EEB by the teacher may be accurately detected by the force detection unit SF22, and movement of the end effector EEB may be executed (see S140, S166, S168 in FIG. 2).

The base BSB is fixed to a floor part and supports the arm 110B. In the base BSB, a force detection unit SF21 is provided. More specifically, the force detection unit SF21 is located between the base BSB and the floor part. The function and the operation principle of the force detection unit SF21 are the same as those of the force detection unit SF11 (see FIG. 1). For facilitating understanding of the technique, the floor part is not shown in FIG. 8.

Also, in the second embodiment, in the teaching by direct teaching, the processing in FIG. 2 for teaching processing and the processing in FIG. 5 for collision sensing are executed by the CPU 501 of the teaching apparatus 50. Note that, in the second embodiment, at step S110 in FIG. 2, the CPU 501 receives output of the force detection unit SF22. Subsequently, the processing in FIG. 2 is performed based on the output of the force detection unit SF22, i.e., the force detected by the force detection unit SF22. Further, in the second embodiment, at step S210 in FIG. 5, the CPU 501 receives output of the force detection unit SF21. Subsequently, the processing in FIG. 5 is performed based on the output of the force detection unit SF21, i.e., the force detected by the force detection unit SF21.

According to the processing, the force applied to the end effector EEB by the teacher may be accurately detected by the force detection unit SF22, and movement of the end effector EEB may be executed (see S140, S166, S168 in FIG. 2). The forces applied to the arm 110B and an arbitrary configuration attached to the arm 110B may be detected by the force detection unit SF21 and stoppage of the end effector EEB may be executed (see S240, S250 in FIG. 5).

The arm 110B in the embodiment is also referred to as "movable unit". The force detection unit SF21 is also referred to as "first detection unit". The force detection unit SF22 is also referred to as "second detection unit".

Figure 9:
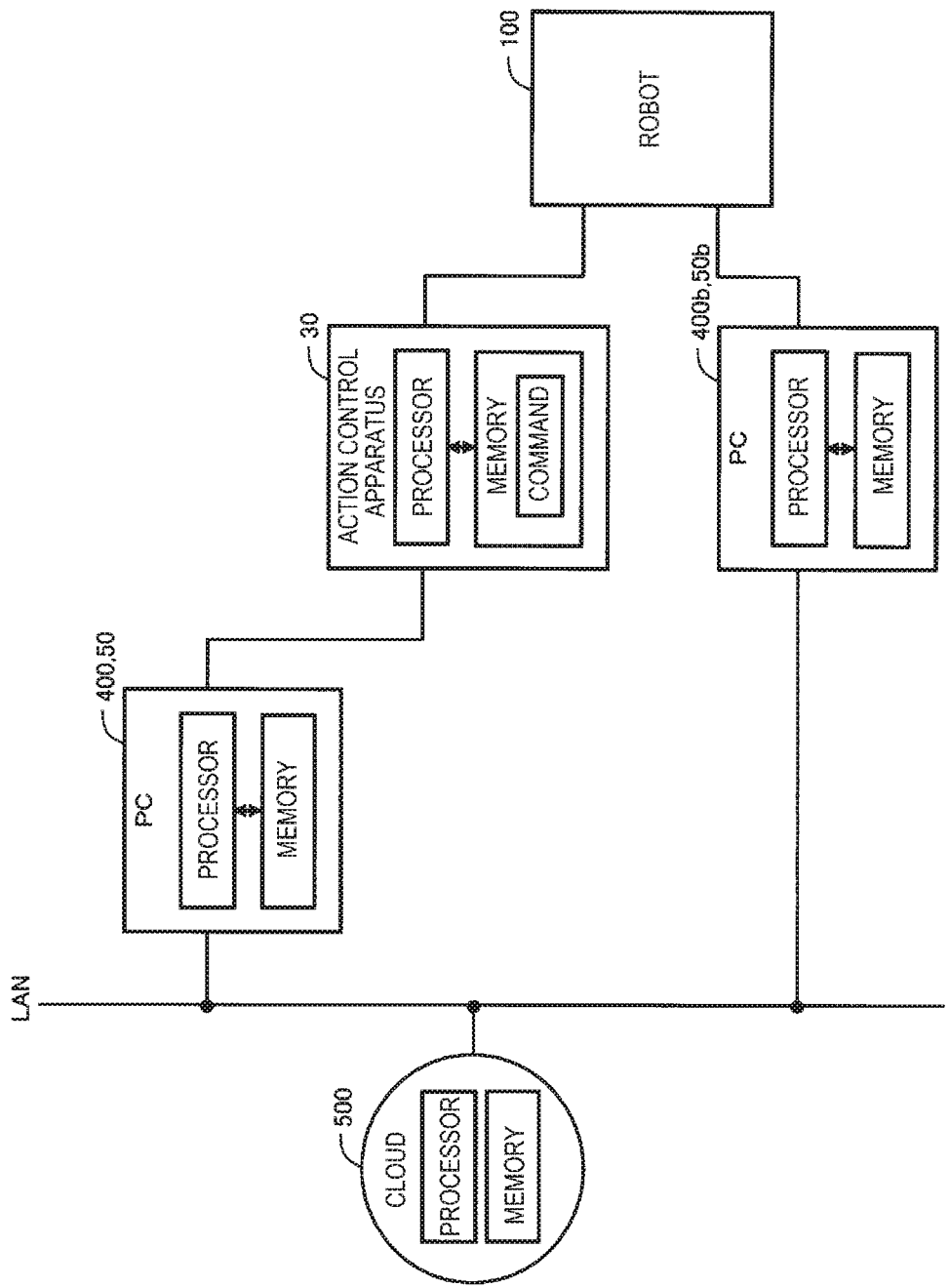
FIG. 9 is a conceptual diagram showing an example of a configuration of a control apparatus of the robot including a plurality of processors.

C. Third Embodiment (1) FIG. 9 is the conceptual diagram showing the example of the configuration of the control apparatus of the robot including a plurality of processors. In this example, in addition to the robot 100 and the action control apparatus 30 thereof, personal computers 400, 400b and a cloud service 500 provided via a network environment such as a LAN are shown. Each of the personal computers 400, 400b includes a processor and a memory. In the cloud service 500, a processor and a memory are also available. The processor executes a computer-executable command. The robot control apparatus 25 containing the action control apparatus 30 and the teaching apparatus 50 can be realized using part or all of the plurality of processors. The teaching apparatus realized by the personal computer 400 is shown by the sign 50, and a teaching apparatus realized by the personal computer 400b is shown by a sign 50b. Further, a memory unit that stores various kinds of information can be realized using part or all of the plurality of memories.

Figure 10:
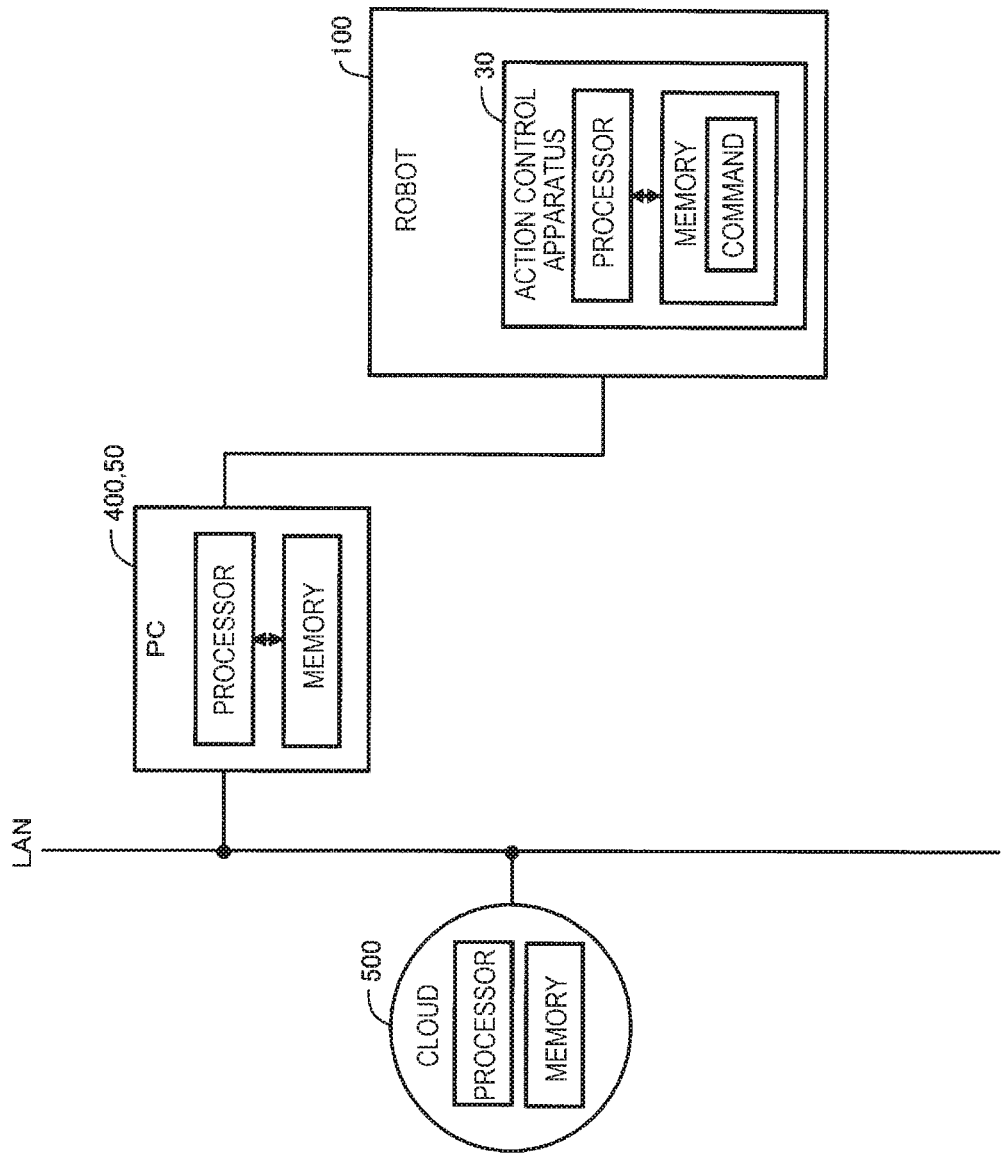
FIG. 10 is a conceptual diagram showing another example of the configuration of the control apparatus of the robot including a plurality of processors.

(2) FIG. 10 is the conceptual diagram showing the other example of the configuration of the control apparatus of the robot including a plurality of processors. This example is different from that in FIG. 9 in that the action control apparatus 30 of the robot 100 is housed in the robot 100. Also, in this example, the robot control apparatus 25 containing the action control apparatus 30 and the teaching apparatus 50 can be realized using part or all of the plurality of processors. Further, a memory unit that stores various kinds of information can be realized using part or all of the plurality of memories.

D. Other Embodiments

D1. Other Embodiment 1

(1) In the above described first embodiment, the base BS is attached to the floor part 800 and supports the arm 110. In the above described second embodiment, the base BSB is attached to the floor part and supports the arm 110B. However, the base may be attached to a ceiling or pedestal and the arm as the movable unit may be suspended from the base. In the embodiment, the force detection unit may be placed between the base and the ceiling or pedestal.

(2) At step S166 of the above described first embodiment, the rotation of the end effector EE is executed by 0.5° in the direction that forms the smallest angle between the direction of the rotation of the first detection force Fd1 and one of the six directions of the U-axis positive direction, the U-axis negative direction, the V-axis positive direction, the V-axis negative direction, the W-axis positive direction, and the W-axis negative direction (see FIG. 2). Further, at step S168 of the first embodiment, the linear movement of the end effector EE is executed by 0.5 mm in the direction that forms the smallest angle between the direction of the first detection force Fd1 and one of the six directions of the X-axis positive direction, the X-axis negative direction, the Y-axis positive direction, the Y-axis negative direction, the Z-axis positive direction, and the Z-axis negative direction.

However, the amount of movement in the movement executed when Condition B is fulfilled may be another amount. For example, the rotation angle may be 0.1°, 1°, and 5°. The distance of the linear movement may be 0.1 mm, 1 mm, and 5 mm.

Or, the direction of the movement in the movement executed when Condition B is fulfilled may be another direction. For example, the rotation may be executed in the direction that forms the smallest angle between the direction of the rotation of the first detection force Fd1 and one of five or less directions such as predetermined two directions, four directions, or the like of the six directions of the U-axis positive direction, the U-axis negative direction, the V-axis positive direction, the V-axis negative direction, the W-axis positive direction, and the W-axis negative direction. Or, the rotation may be executed in the direction of the rotation of the first detection force Fd1. For example, the linear movement may be executed in the direction that forms the smallest angle between the direction of the rotation of the first detection force Fd1 and one of five or less directions such as predetermined two directions, four directions, or the like of the six directions of the X-axis positive direction, the X-axis negative direction, the Y-axis positive direction, the Y-axis negative direction, the Z-axis positive direction, and the Z-axis negative direction.

(3) In the above described embodiment, when Condition D is fulfilled, the stoppage of the end effector EE is executed (S220, S240, S250 in FIG. 5). However, an embodiment in which the end effector is decelerated when Condition D is fulfilled may be employed. Also, in the embodiment, the probability of breakage of the robot 100 may be reduced.

D2. Other Embodiment 2

(1) In the above described embodiments, all of the end time threshold value Tthe, the first time threshold value Tth1, the second time threshold value Tth2, and the third time threshold value Tth3 are set to 200 ms. However, the end time threshold value Tthe, the first time threshold value Tth1, the second time threshold value Tth2, and the third time threshold value Tth3 may be set to other values. Further, in the above described embodiments, the first time threshold value Tth1 is a value equal to or smaller than the second time threshold value Tth2 and the third time threshold value Tth3. However, the first time threshold value Tth1 may be the same value as or larger than the second time threshold value Tth2. Or, the first time threshold value Tth1 may be the same value as or larger than the third time threshold value Tth3.

(2) In the above described embodiments, when Condition B1 or B2 is satisfied, the processing at step S160 is performed (see S130, S160 in FIG. 2). However, an embodiment in which the processing at step S160 is performed when the judgment of Condition B2 is not performed, but Condition B1 is satisfied may be employed. Or, an embodiment in which the processing at step S160 is performed when the judgment of Condition B1 is not performed, but Condition B2 is satisfied may be employed.

(3) In the above described embodiments, Condition B2 is that the time in which the magnitude of the first detection force Fd1 is larger than the third force threshold value Fth3 and smaller than the first force threshold value Fth1 continued for the duration longer than the second time threshold value Tth2. However, Condition B2 may be set to that a time in which the magnitude of the first detection force Fd1 is larger than the third force threshold value Fth3 continued for a duration longer than the second time threshold value Tth2. That is, an embodiment in which, in Condition B2, the upper limit is not provided with respect to the magnitude of the first detection force Fd1 may be employed.

D3. Other Embodiment 3

(1) In the above described embodiments, the processing in FIG. 2 is repeated in the predetermined first period. The processing in FIG. 5 is repeated in the predetermined second period. However, at least one of the processing in FIG. 2 and the processing in FIG. 5 may be executed in an embodiment in which the processing moves at each time when a predetermined condition is satisfied, not switched in a predetermined period.

(2) In the above described embodiments, the first period is longer than the second period. However, the first period may be equal to or shorter than the second period.

D4. Other Embodiment 4

In the above described embodiments, the first period in which the processing in FIG. 2 is repeatedly executed is 20 times the second period in which the processing in FIG. 5 is repeatedly executed. However, the relationship between the first period and the second period may be another relationship. For example, the first period may be twice, five times, 10 times, 30 times, 50 times, 80 times, or 100 times the second period. Note that the first period may be 10 to 50 times the second period.

D5. Other Embodiment 5

In the above described first embodiment, the force detection unit SF11 is located between the base BS and the floor part 800 (see FIG. 1). In the above described second embodiment, the force detection unit SF21 is located between the base BSB and the floor part (see FIG. 8). However, the force detection unit may be provided in another part such as a part between the base and the joint closest to the base or a part between the joint closest to the base and the joint second closest to the base.

D6. Other Embodiment 6

In the above described first embodiment, Conditions A to E are judged based on the output of the force detection unit SF11 provided in the base BS (see FIGS. 1, 2, and 5). However, the judgments with respect to the respective conditions may be made based on forces detected using other methods.

For example, the force applied to the arm 110 may be calculated based on torques applied to the respective joints detected by the torque sensors 610 provided in the respective joints (see FIG. 1) and information of weights of the respective arm elements L11 to L13 and positions of the respective joints.

Or, the judgments on the respective conditions may be made using any of the torque sensors provided in the joints, the force detection unit provided in the base, and the force detection unit provided between the movable unit and the end effector. Note that the judgments of Conditions A and B may be made using the force detection unit provided between the movable unit and the end effector or the torque sensors provided in the joints. Further, the judgments of Conditions D and E are made using the torque sensors provided in the joints or the force detection unit provided in the base.

A robot system not including at least a part of the torque sensors provided in the joints, the force detection unit provided in the base, and the force detection unit provided between the movable unit and the end effector may be configured (see FIGS. 1 and 8). Also, in the robot system, the judgments of the respective conditions may be made using the provided force detection unit or torque sensors (see FIGS. 2 and 5).

D7. Other Embodiment 7

(1) In the above described second embodiment, the force detection unit SF22 is provided between the arm 110B and the end effector EEB (see FIG. 8). However, the force detection unit may be provided in another part such as a part between the joint closest to the distal end side and the joint second closest to the distal end side of the movable unit as the arm.

(2) Or, the force detection unit may be provided in any other location than in the base or the part between the end effector and the movable unit regardless of whether the robot is a scalar robot or vertical articulated robot. The number of the force detection units may be any number equal to or larger than one, e.g. two, three, four, five, or six.

D8. Other Embodiment 8

In the above described second embodiment, Conditions D and E are judged based on the output of the force detection unit SF21 provided in the base BSB (see FIGS. 8 and 5). Further, Conditions A to C are judged based on the output of the force detection unit SF22 provided between the arm 110B and the end effector EEB. However, the judgments of the respective conditions may be made based on forces detected using other methods as described in the other embodiment 6.

D9. Other Embodiment 9

(1) In the above described embodiments, the force detection unit SF11 is the force sensor including quartz crystal piezoelectric element. However, the respective force detection units may be force sensors including piezoelectric elements using semiconductors or strain gauges.

(2) In the above described embodiments, the third force threshold value Fth3 is set to 2 N. The first force threshold value Fth1 is set to 6 N. The second force threshold value Fth2 is set to 30 N. However, the first force threshold value Fth1 to the third force threshold value Fth3 may be set to other values such as 5 N, 10 N, or 40 N. Note that the first force threshold value Fth1 is preferably set to 6 to 12 N. The second force threshold value Fth2 is preferably set to a value equal to or larger than 30 N. The third force threshold value Fth3 is preferably set to 1 to 10 N and more preferably set to 2 to 6 N. In this specification, a range of numeric values shown by "A to B" refers to a range larger than A and smaller than B.

E. Still Other Embodiments

The present disclosure is not limited to the above described embodiments, but may be realized in various configurations without departing from the scope thereof. For example, the present disclosure can be realized in the following aspects. The technical features in the above described embodiments corresponding to the technical features in the following respective aspects can be replaced or combined as appropriate for solving part or all of the problems of the present disclosure or achieving part or all of the effects of the present disclosure. Further, the technical features can be deleted as appropriate unless the technical features are explained as essential features in this specification.

(1) According to one aspect of the present disclosure, a robot system is provided. The robot system includes a robot having a base, a movable unit provided movably relative to the base, and a force detection unit that detects a force applied to the movable unit, and a control unit that controls the movable unit according to the force detected by the force detection unit in teaching of the robot. When a first condition that a time in which magnitude of a first detection force detected by the force detection unit is larger than a first force threshold value continued for a time longer than zero and shorter than a first time threshold value is satisfied in the teaching, the control unit moves the movable unit in a predetermined amount in a direction according to a direction of the first detection force, and, when a second condition that magnitude of a second detection force detected by the force detection unit is larger than a second force threshold value that is larger than the first force threshold value is satisfied during the movement of the movable unit, decelerates or stops the movable unit.

In the aspect, the force detection unit detects the force applied to the movable unit. Then, when a force larger than the second force threshold value is applied to the movable unit by collision during movement of the movable unit due to a fulfillment of the first condition, the force detection unit may sense this and decelerate or stop the movable unit. Accordingly, the probability of breakage of the robot may be reduced.

(2) In the robot system of the above described aspect, when a third condition that a time in which the magnitude of the first detection force is larger than a third force threshold value that is smaller than the first force threshold value continued for a duration longer than a second time threshold value is satisfied in the teaching, the control unit may repeatedly execute the movement of the movable unit in the predetermined amount in the direction according to the direction of the first detection force during the duration.

In the aspect, accurate movement in an amount of a multiple of the predetermined amount may be realized with respect to the movable unit by single press by the teacher. Accordingly, load on the teaching by the teacher may be reduced.

(3) In the robot system of the above described aspect, the control unit may repeatedly determine whether or not the first condition or the third condition is satisfied in a first period in the teaching and may repeatedly determine whether or not the second condition is satisfied in a second period during the movement of the end effector, and the first period may be longer than the second period.

According to the aspect, the second period is made shorter than the first period, and thereby, a collision unintendedly occurring during the movement of the end effector may be promptly sensed. On the other hand, the first period is made longer than the second period, and thereby, an external force applied by the teacher may be sensed with sufficient accuracy and processing load on the control unit may be reduced.

(4) In the robot system of the above described aspect, the force detection unit may include a force detection unit having a piezoelectric element, the control unit may repeatedly execute the movement of the movable unit in the predetermined amount in the direction according to the direction of the first detection force during the duration based on output of the force detection unit having the piezoelectric element, and the third force threshold value may be larger than 1 N and smaller than 10 N.

According to the aspect, the third force threshold value is larger than 1 N, and thereby, noise assumed in the force detection unit having the piezoelectric element may be removed and the movement of the movable unit in the predetermined amount may be repeatedly executed. Further, the third force threshold value is smaller than 10 N, and thereby, application of an external force to the robot by the teacher is performed in a range in which residual vibration of the movable unit is sufficiently small.

In the robot system of the above described aspect, the first period may be 10 to 50 times the second period.

According to the aspect, processing load on the control unit may be further reduced with achieved balance between prompt sensing of a collision unintendedly occurring during the movement of the end effector and detection of an external force applied by the teacher with sufficient accuracy.

(5) In the robot system of the above described aspect, the one or more force detection units may include a first force detection unit provided in the base.

According to the aspect, the forces applied to the movable unit and an arbitrary configuration attached to the movable unit may be detected by the first force detection unit.

(6) In the robot system of the above described aspect, the control unit may judge the first condition based on output of the first force detection unit in the teaching, and judge the second condition based on the output of the first force detection unit during the movement of the movable unit.

According to the aspect, the movement of the movable unit based on the external force in the teaching and deceleration or stoppage of the movable unit during the movement of the movable unit may be realized by the single first force detection unit.

(7) In the robot system of the above described aspect, the force detection unit may include an end effector provided in the movable unit and a second force detection unit provided between the movable unit and itself.

According to the aspect, the force applied to the end effector by the teacher may be accurately detected by the second force detection unit, and the movement of the movable unit may be executed.

(8) In the robot system of the above described aspect, the control unit may judge the first condition based on output of the second force detection unit in the teaching, and judge the second condition based on the output of the first force detection unit during the movement of the movable unit.

According to the aspect, the force applied to the end effector by the teacher may be accurately detected by the second force detection unit, and the movement of the end effector may be executed. Further, the forces applied to the movable unit and an arbitrary configuration attached to the movable unit may be detected by the first force detection unit, and deceleration or stoppage of the end effector may be executed.

(9) According to another aspect of the present disclosure, a control apparatus is provided. The control apparatus is a control apparatus that, in teaching of a robot having a base, a movable unit provided movably relative to the base, and a force detection unit that detects a force applied to the movable unit, controls the movable unit according to the force detected by the force detection unit. When a first condition that a time in which magnitude of a first detection force detected by the force detection unit is larger than a first force threshold value continued for a time longer than zero and shorter than a first time threshold value is satisfied in the teaching, the control apparatus moves the movable unit in a predetermined amount in a direction according to a direction of the first detection force, and, when a second condition that magnitude of a second detection force detected by the force detection unit is larger than a second force threshold value that is larger than the first force threshold value is satisfied during the movement of the movable unit, decelerates or stops the movable unit.

The present disclosure can be realized in other various aspects than a control apparatus that controls a robot, the robot, a robot system, and a control method for the robot. For example, the present disclosure may be realized in aspects including a computer program for realizing a manufacturing method for the robot, a control method for the robot, and a non-transitory recording medium recording the computer program.

Not all of the plurality of component elements of the respective aspects of the above described present disclosure are essential. To solve part or all of the above described problems or achieve part or all of the effects described in this specification, changes, deletion, replacements by new other component elements, partial deletion of limitations can be made with respect to partial component elements of the plurality of component elements as appropriate. Further, to solve part or all of the above described problems or achieve part or all of the effects described in this specification, the technical features contained in one aspect of the above described present disclosure can be combined with the technical features contained in the other aspect of the above described present disclosure to form one independent aspect of the present disclosure.

What is claimed is:

1. A robot system comprising:
a robot having a base, a movable unit provided movably relative to the base, and a force detection unit that detects a force applied to the movable unit; and
a control unit that controls the movable unit according to the force detected by the force detection unit in teaching of the robot, wherein
when a first condition that a time in which magnitude of a first detection force detected by the force detection unit is larger than a first force threshold value continued for a time longer than zero and shorter than a first time threshold value is satisfied in the teaching, the control unit moves the movable unit in a predetermined amount in a direction according to a direction of the first detection force, and
when a second condition that magnitude of a second detection force detected by the force detection unit is larger than a second force threshold value that is larger than the first force threshold value is satisfied during the movement of the movable unit, the control unit decelerates or stops the movable unit.

2. The robot system according to claim 1, wherein
when a third condition that a time in which the magnitude of the first detection force is larger than a third force threshold value that is smaller than the first force threshold value continued for a duration longer than a second time threshold value is satisfied in the teaching, the control unit repeatedly executes the movement of the movable unit in the predetermined amount in the direction according to the direction of the first detection force during the duration.

3. The robot system according to claim 2, wherein
the control unit repeatedly determines whether or not the first condition or the third condition is satisfied in a first period in the teaching and repeatedly determines whether or not the second condition is satisfied in a second period during the movement of the movable unit, and
the first period is longer than the second period.

4. The robot system according to claim 2, wherein
the force detection unit includes a force detection unit having a piezoelectric element,
the control unit repeatedly executes the movement of the movable unit in the predetermined amount in the direction according to the direction of the first detection force in the duration based on output of the force detection unit having the piezoelectric element, and
the third force threshold value is larger than 1 N and smaller than 10 N.

5. The robot system according to claim 1, wherein
the force detection unit includes a first force detection unit provided in the base.

6. The robot system according to claim 5, wherein
the control unit judges the first condition based on output of the first force detection unit in the teaching, and judges the second condition based on the output of the first force detection unit during the movement of the movable unit.

7. The robot system according to claim 5, wherein
the force detection unit includes an end effector provided in the movable unit and a second force detection unit provided between the movable unit and itself.

8. The robot system according to claim 7, wherein
the control unit judges the first condition based on output of the second force detection unit in the teaching, and judges the second condition based on the output of the first force detection unit during the movement of the movable unit.

9. A control apparatus that, in teaching of a robot having a base, a movable unit provided movably relative to the base, and a force detection unit that detects a force applied to the movable unit, controls the movable unit according to the force detected by the force detection unit,
when a first condition that a time in which magnitude of a first detection force detected by the force detection unit is larger than a first force threshold value continued for a time longer than zero and shorter than a first time threshold value is satisfied in the teaching, moving the movable unit in a predetermined amount in a direction according to a direction of the first detection force, and
when a second condition that magnitude of a second detection force detected by the force detection unit is larger than a second force threshold value that is larger than the first force threshold value is satisfied during the movement of the movable unit, decelerating or stopping the movable unit.

10. A robot teaching control method for causing a processor to execute a process, the method comprising executing on the processor the steps of:
detecting a first detection force or a second detection force applied to an arm of a robot by a force sensor, the robot having a base, the base being provided at the arm, the force sensor being provided at the arm;
determining whether a first condition is satisfied, the first condition being that a time in which magnitude of the first detection force is larger than a first force threshold value continued for a time longer than zero and shorter than a first time threshold value;
moving the arm in a direction according to a direction of the first detection force in a predetermined amount in response to a determination of the first condition;
determining whether a second condition is satisfied, the second condition being that a magnitude of the second detection force is larger than a second force threshold value that is larger than the first force threshold value during the movement of the arm; and
decelerating or stopping the arm in response to a determination of the second condition.

* * * * *